(12) United States Patent
Nishi

(10) Patent No.: US 12,387,359 B2
(45) Date of Patent: Aug. 12, 2025

(54) PACKAGE MEASURING APPARATUS AND PACKAGE MEASURING METHOD

(71) Applicant: NEC Platforms, Ltd., Kawasaki (JP)

(72) Inventor: Youhei Nishi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 421 days.

(21) Appl. No.: 17/893,571

(22) Filed: Aug. 23, 2022

(65) Prior Publication Data
US 2023/0071500 A1    Mar. 9, 2023

(30) Foreign Application Priority Data
Sep. 3, 2021    (JP) ................................. 2021-143643

(51) Int. Cl.
G01B 11/02    (2006.01)
G01B 11/22    (2006.01)
G06T 7/62    (2017.01)

(52) U.S. Cl.
CPC ................ *G06T 7/62* (2017.01); *G01B 11/22* (2013.01)

(58) Field of Classification Search
None
See application file for complete search history.

(56) References Cited

U.S. PATENT DOCUMENTS

| | | | | |
|---|---|---|---|---|
| 2003/0147075 A1* | 8/2003 | Otsuki | ................ | C23C 16/4412 356/338 |
| 2018/0215564 A1* | 8/2018 | Matsumura | .......... | B65H 3/0684 |
| 2020/0139553 A1* | 5/2020 | Diankov | ................... | G06T 7/50 |
| 2023/0108073 A1* | 4/2023 | Li | ........................ | B65G 1/0492 700/216 |

FOREIGN PATENT DOCUMENTS

| | | | | |
|---|---|---|---|---|
| CN | 204162105 | * | 2/2015 | ............. B65G 65/34 |
| JP | 2008-151714 A | | 7/2008 | |
| JP | 2018-510347 A | | 4/2018 | |
| JP | 2020-016645 A | | 1/2020 | |
| JP | 2021-081431 A | | 5/2021 | |
| JP | 2022-106386 A | | 7/2022 | |
| KR | 20120065751 | * | 6/2012 | ............. B65G 49/06 |

OTHER PUBLICATIONS

JP Office Action for JP Application No. 2021-143643, mailed on Jul. 4, 2023 with English Translation.
JP Office Communication for JP Application No. 2021-143643, mailed on Oct. 31, 2023 with English Translation.

* cited by examiner

*Primary Examiner* — Beniyam Menberu

(57) ABSTRACT

A package measuring apparatus according to the present disclosure includes: a mounting table; floatation member configured to float a package above an upper surface of the mounting table; a depth sensor configured to capture an image of the package being floated by the floatation member above the upper surface of the mounting table and thereby detect a distance between the depth sensor and the package, the depth sensor being disposed at a position where the depth sensor is able to capture the image of the package from substantially directly above it; and a control unit configured to calculate a size of the package based on data acquired from the depth sensor.

5 Claims, 15 Drawing Sheets

PACKAGE MEASURING APPARATUS AND PACKAGE MEASURING METHOD

INCORPORATION BY REFERENCE

This application is based upon and claims the benefit of priority from Japanese patent application No. 2021-143643, filed on Sep. 3, 2021, the disclosure of which is incorporated herein in its entirety by reference.

TECHNICAL FIELD

The present disclosure relates to a package measuring apparatus and a package measuring method.

BACKGROUND ART

A package measuring apparatus, which measure the size (the width, the depth, the height) of a package using a depth sensor, has been known.

For example, Japanese Unexamined Patent Application Publication No. 2021-081431 discloses a package measuring apparatus that captures an image of a package using a depth sensor from substantially directly above it and thereby detects a distance between the depth sensor and a rectangular parallelepiped package placed on a mounting table, and calculates the size of the package based on data acquired from the depth sensor.

However, in the package measuring apparatus disclosed in Japanese Unexamined Patent Application Publication No. 2021-081431, when the size of a thin package such as a general envelope and a padded envelope is measured, since the difference between the distance from the depth sensor to the package and the distance from the depth sensor to the mounting table is small, it is difficult to identify the package. This causes a problem that the accuracy of the measurement of the size of the package may deteriorate.

SUMMARY

Therefore, an object of the present disclosure is to solve the above-described problem and to provide a package measuring apparatus and a package measuring method that are capable of improving the accuracy of measurement of the size of a package even when the size of a thin package is measured.

A package measuring apparatus according to an example aspect includes:
  a mounting table;
  floatation member configured to float a package above an upper surface of the mounting table;
  a depth sensor configured to capture an image of the package being floated by the floatation member above the upper surface of the mounting table and thereby detect a distance between the depth sensor and the package, the depth sensor being disposed at a position where the depth sensor is able to capture the image of the package from substantially directly above it; and
  a control unit configured to calculate a size of the package based on data acquired from the depth sensor.

A package measuring method according to an example aspect includes:
  floating a package above an upper surface of a mounting table by floatation member;
  capturing an image of the package being floated by the floatation member above the upper surface of the mounting table and thereby detecting a distance between a depth sensor and the package by the depth sensor disposed at a position where the depth sensor is able to capture the image of the package from substantially directly above it; and
  calculating a size of the package based on data acquired from the depth sensor.

BRIEF DESCRIPTION OF DRAWINGS

The above and other aspects, features, and advantages of the present disclosure will become more apparent from the following description of certain example embodiments when taken in conjunction with the accompanying drawings, in which.

EXAMPLE EMBODIMENT

Figure 1:
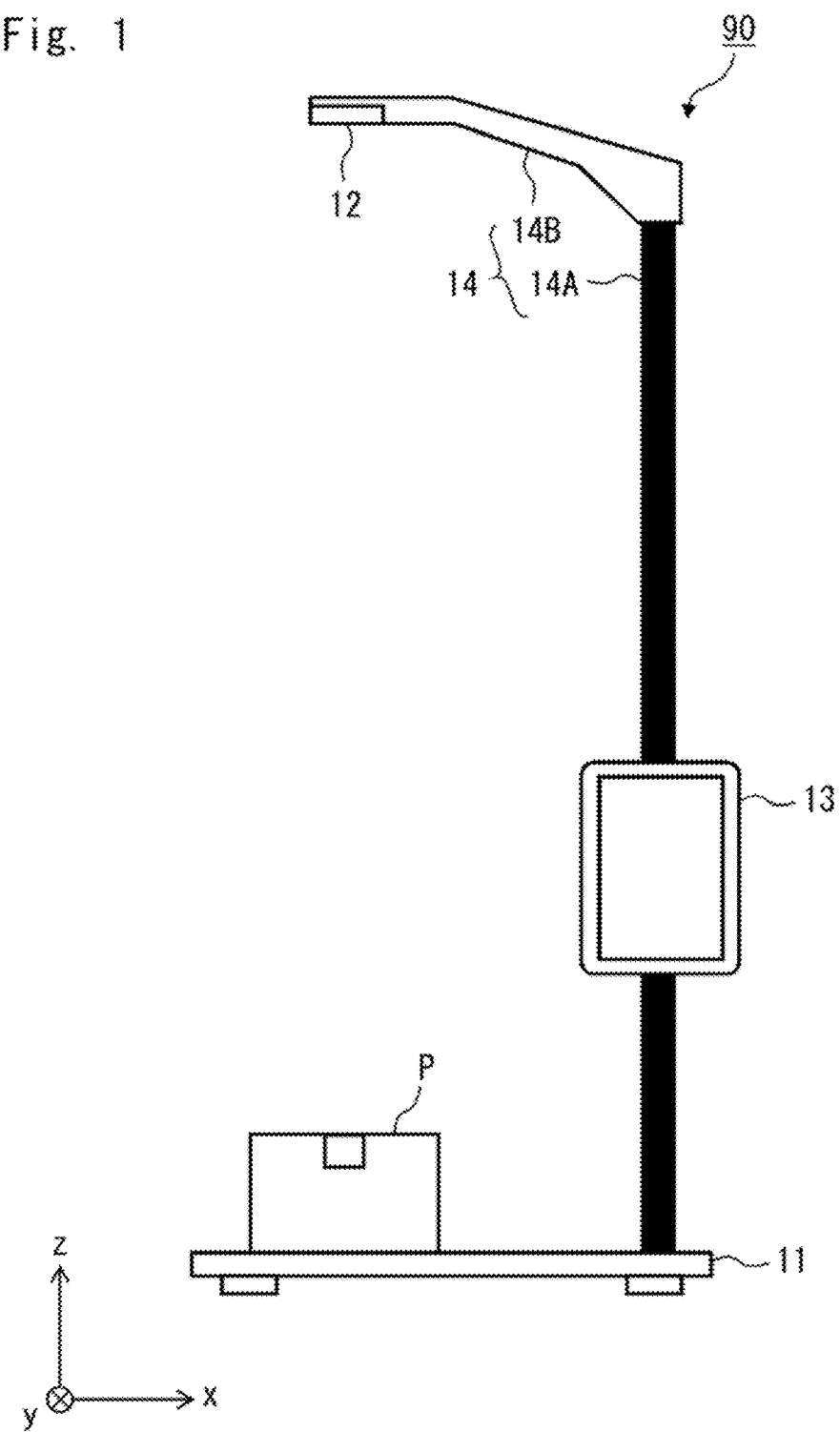
FIG. 1 is a diagram showing an example of a configuration of a package measuring apparatus according to the related art.

The related art and example embodiments will be described hereinafter with reference to the drawings. Note that, for the clarification of the description, the following descriptions and the drawings are partially omitted and simplified as appropriate. Further, the same elements are denoted by the same reference numerals or symbols throughout the drawings, and redundant descriptions are omitted as necessary.

<Related Art>

Prior to describing the example embodiments of the present disclosure, the related art will be described.

FIG. 1 is a diagram showing an example of a configuration of a package measuring apparatus 90 according to the related art.

As shown in FIG. 1, the package measuring apparatus 90 according to the related art includes a mounting table 11, a depth sensor 12, and a control unit 13.

The mounting table 11 is a table on which a package P is placed. Note that, although the shape of the mounting table 11 is not limited, it is assumed that the upper surface thereof on which the package P is placed is at least planar.

The depth sensor 12 is disposed at a position where it can capture an image of the package P placed on the mounting table 11 from directly above it, and captures an image of the package P and thereby detects the distance between the depth sensor 12 and the package P. The depth sensor 12 may employ a Time Of Flight (TOF) method, or other measuring methods such as a pattern irradiation method. Further, although an infrared light or the like may be used in performing the measurement, it is not limited thereto. It is needless to mention that the term "directly above" may indicate substantially directly above.

Further, in the example shown in FIG. 1, the depth sensor 12 is attached to the mounting table 11 via a sensor attachment part 14. The sensor attachment part 14 includes a support pillar 14A vertically installed on the mounting table 11, and a sensor attachment member 14B installed at an upper end of the support pillar 14A. The sensor attachment member 14B may include a mechanism for sliding the depth sensor 12 so that a position of the depth sensor 12 in the horizontal direction (the xy direction) (i.e., a distance between the depth sensor 12 and the support pillar 14A) can be changed. Further, the support pillar 14A may include a mechanism capable of changing its height (the z-direction). This makes it possible to change the height of the depth sensor 12. However, the method for installing the depth sensor 12 is not limited to the above, and the depth sensor 12 can be installed by any method in a position where it can capture an image of the package P placed on the mounting table 11 from directly above it.

The control unit 13 is configured to be able to communicate with the depth sensor 12 wirelessly or by wire, and calculates the size (the width, the depth, the height) of the package P placed on the mounting table 11 based on data acquired from the depth sensor 12.

Further in the example shown in FIG. 1, the control unit 13 is implemented by a tablet terminal which is also referred to as a mobile Personal Computer (PC). However, the method for implementing the control unit 13 is not limited thereto, and the control unit 13 may be implemented by an apparatus such as a stationary PC or a mobile phone (including one referred to as a smartphone).

Further, in the example shown in FIG. 1, the control unit 13 is attached to the support pillar 14A. However, the place where the control unit 13 is installed is not limited thereto, and the control unit 13 may be installed in any place near the mounting table 11. Further, when the control unit 13 is implemented by a tablet terminal or a mobile phone, it is not necessary for the control unit 13 to be fixedly installed.

Next, the measurement principle in accordance with which the package measuring apparatus 90 according to the related art measures the size of the package P will be described. Note that it is assumed that the control unit 13 captures an image of the mounting table 11 on which no package P is placed by the depth sensor 12 in advance and holds it as background depth image data.

Step A1:

First, the control unit 13 controls the depth sensor 12 so as to capture an image of the package P placed on the mounting table 11 from directly above it and thereby acquires depth image data of the package P.

Step A2:

Next, the control unit 13 compares the depth image data of the package P with the background depth image data, and then it extracts a contour of the package P in a plan view (the xy plane).

Step A3:

If the shape of the package P is a rectangular parallelepiped shape, the contour of the package P in a plan view is a rectangle. Therefore, the control unit 13 calculates lengths of two sides of the rectangle as the width and the depth of the package P.

Figure 2:
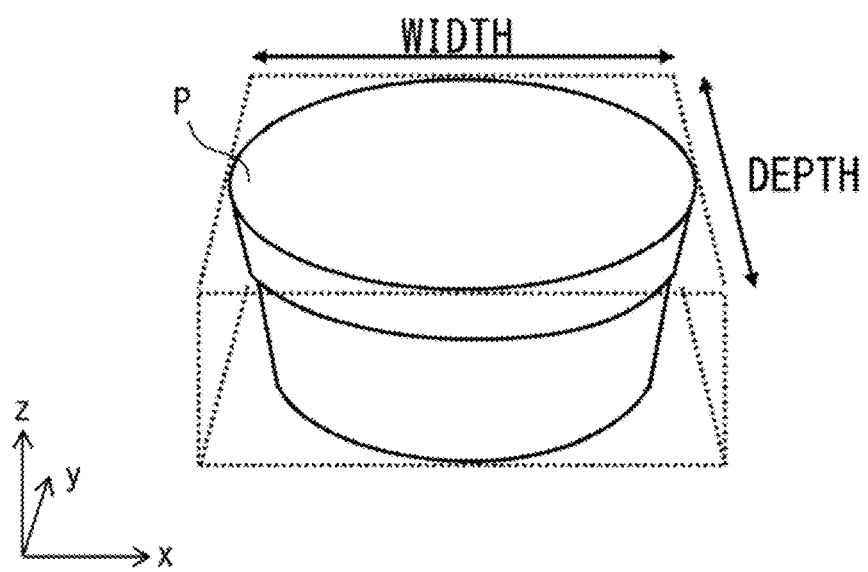
FIG. 2 is a diagram showing an example of a rectangular parallelepiped circumscribing a package.

On the other hand, if the shape of the package P is not a rectangular parallelepiped shape, the contour of the package P in a plan view is not a rectangle. Therefore, when the shape of the package P is not a rectangular parallelepiped shape, the control unit 13 assumes that a rectangular parallelepiped circumscribing the package P is the package P as shown in FIG. 2 and calculates lengths of two sides of the rectangle which is the upper surface of the rectangular parallelepiped as the width and the depth of the package P.

A method for the control unit 13 to calculate the width and the depth of the package P will be described below. A description will be given below in accordance with the assumption that the shape of the package P is not a rectangular parallelepiped shape and the contour of the package P in a plan view is elliptical as shown in FIG. 3.

Figure 3:
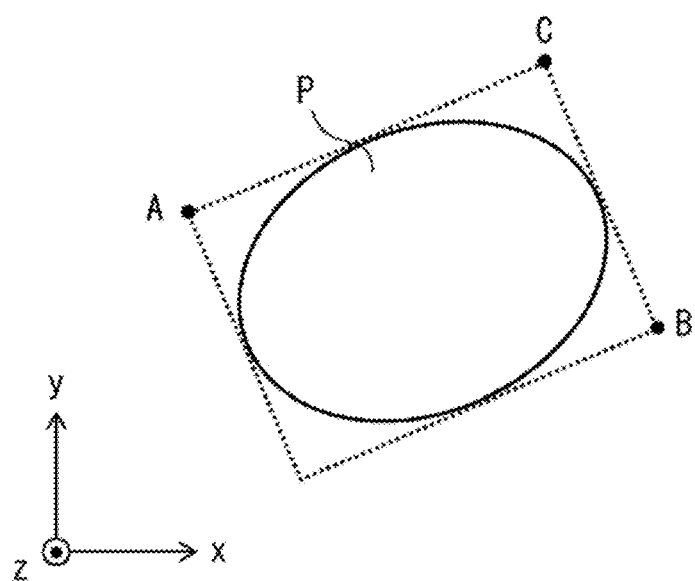
FIG. 3 is a diagram showing an example of a contour of a package in a plan view.

In the example shown in FIG. 3, the shape of the package P is not a rectangular parallelepiped shape, and the contour of the package P in a plan view is elliptical. Therefore, the control unit 13 assumes that a rectangular parallelepiped (a dotted line in the figure) circumscribing the package P is the package P.

Next, the control unit 13 specifies the following positions of first to third vertices of the aforementioned package P which the control unit 13 has assumed is a rectangular parallelepiped. The first vertex is the leftmost vertex among the vertices of the above assumed rectangular parallelepiped on the upper surface thereof. The second vertex is the rightmost vertex among the vertices of the above assumed rectangular parallelepiped on the upper surface thereof. The third vertex is the uppermost or the lowermost vertex among the vertices of the above assumed rectangular parallelepiped on the upper surface thereof. Note that it may be determined in advance whether the third vertex is the uppermost or the lowermost vertex.

The control unit 13 obtains two-dimensional (planar) coordinates of the first vertex in the space of which the origin is the center of the depth sensor 12 as follows. That is, the control unit 13 obtains the two-dimensional coordinates of the first vertex based on a viewing angle of the depth sensor 12, data of the distance between the first vertex and the depth sensor 12, the number of sensor elements of the depth sensor 12, and position data of the sensor element of the depth sensor 12 corresponding to the first vertex.

Similarly, the control unit 13 obtains two-dimensional coordinates of the second vertex and the third vertex in the space of which the origin is the center of the depth sensor 12 as follows. That is, the control unit 13 obtains the two-dimensional coordinates of the second vertex based on a viewing angle of the depth sensor 12, data of the distance between the second vertex and the depth sensor 12, the number of sensor elements of the depth sensor 12, and position data of the sensor element of the depth sensor 12 corresponding to the second vertex. Further, the control unit 13 obtains the two-dimensional coordinates of the third vertex based on a viewing angle of the depth sensor 12, data of the distance between the third vertex and the depth sensor 12, the number of sensor elements of the depth sensor 12, and position data of the sensor element of the depth sensor 12 corresponding to the third vertex.

Then, the control unit 13 calculates the length of a first side between the first vertex and the third vertex based on the two-dimensional coordinates of each of the first vertex, the second vertex, and the third vertex and calculates the length of a second side between the second vertex and the third vertex. One of the length of the first side and the length of the second side calculated here is the width of the package P, and the other one is the depth of the package P.

For example, in the example shown in FIG. 3, regarding the package P which the control unit 13 has assumed is a rectangular parallelepiped, the leftmost vertex is a vertex A, the rightmost vertex is a vertex B, and the uppermost vertex is a vertex C among the vertices on the upper surface of the rectangular parallelepiped. Therefore, if it is determined that the third vertex is the uppermost vertex, the first vertex, the second vertex, and the third vertex are the vertex A, the vertex B, and the vertex C, respectively. Thus, the first side is a side AC and the second side is a side BC.

Therefore, in the example shown in FIG. 3, the control unit 13 first obtains the two-dimensional coordinates of each of the vertices A, B, and C, and then calculates the length of the side AC and the length of the side BC based on the two-dimensional coordinates of each of the vertices A, B, and C. Then, the control unit 13 sets one of the length of the side AC and the length of the side BC as the width of the package P, and sets the other one as the depth of the package P.

Step A4:

After that, the control unit 13 calculates a height of the package P based on the data of the distance from the depth sensor 12 to the upper surface of the package P in the depth image data of the package P and the data of the distance from the depth sensor 12 to the upper surface of the mounting table 11 in the background depth image data of the package P.

In this way, the control unit 13 can measure the size (the width, the depth, the height) of the package P.

Figure 4:
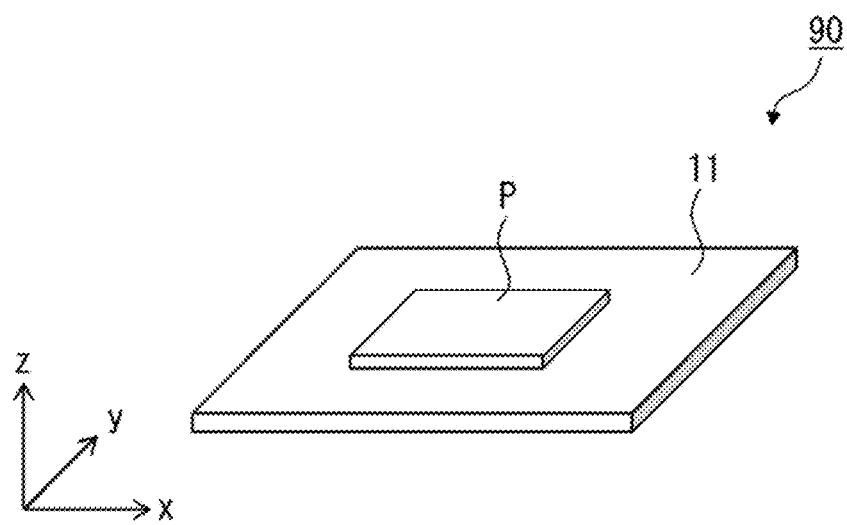
FIG. 4 is a perspective view showing an example of a configuration of the package measuring apparatus according to the related art.
Figure 5:
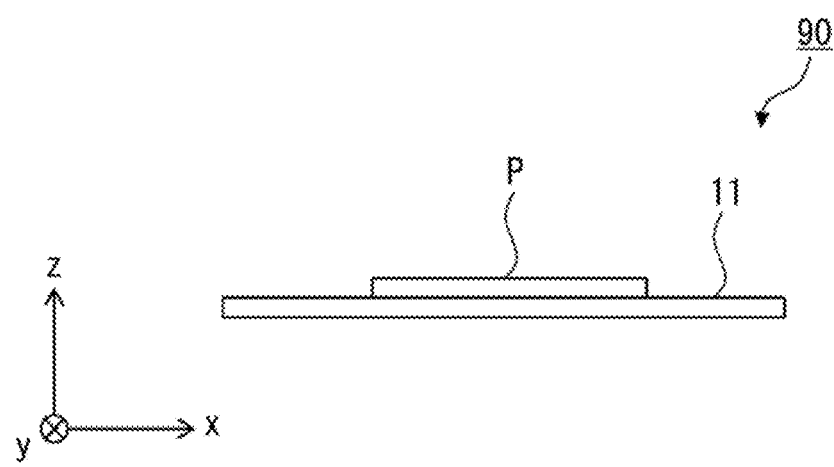
FIG. 5 is a front view showing an example of a configuration of the package measuring apparatus according to the related art.

However, as shown in FIGS. 4 and 5, the package P may be a thin package such as a general envelope or a padded envelope. In this case, since the difference between the distance from the depth sensor 12 to the package P and the distance from the depth sensor 12 to the mounting table 11 is small, it is difficult for the control unit 13 to identify the package P. As a result, in the above-described Step A2, since the control unit 13 cannot accurately extract the contour of the package P in a plan view, the accuracy of measurement of the size of the package P deteriorates. This problem will be described below with reference to FIG. 6.

Figure 6:
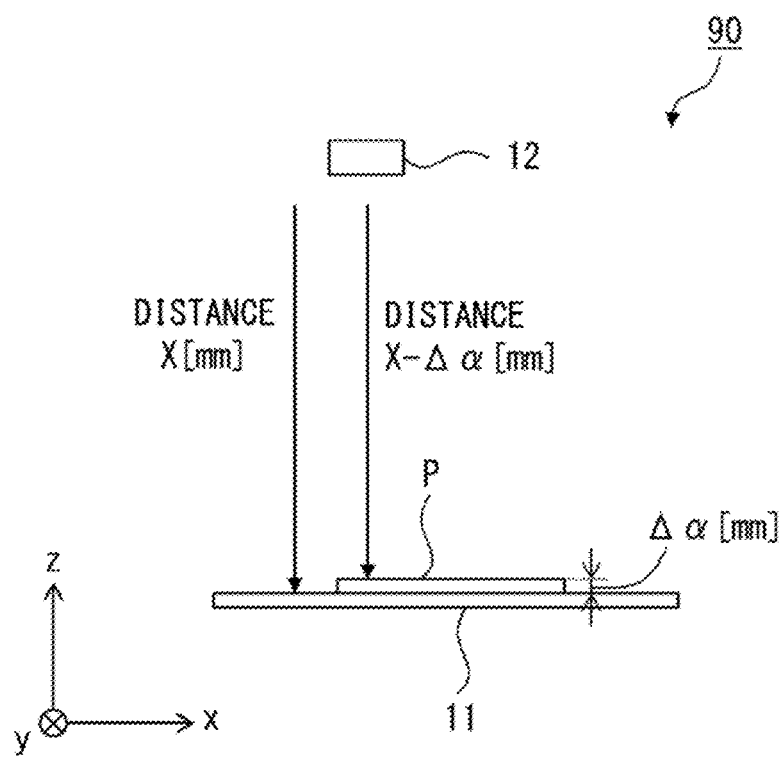
FIG. 6 is a diagram for explaining a problem of the package measuring apparatus according to the related art.

As shown in FIG. 6, when the package P is a thin package having a height of $\Delta\alpha$ [mm] and it is assumed the distance from the depth sensor 12 to the upper surface of the mounting table 11 is X [mm], the distance from the depth sensor 12 to the upper surface of the package P is X-$\Delta\alpha$ [mm].

However, a value of the distance detected by the depth sensor 12 has a variation $\beta$. Therefore, the control unit 13 cannot distinguish whether or not the above-described X-$\Delta\alpha$ is a value (X±$\beta$) varied by the variation $\beta$ of the depth sensor 12, and thus it is difficult to identify the package P.

Therefore, when the size of a thin package P is measured, the package measuring apparatus 90 according to the related art cannot accurately extract the contour of the package P in a plan view in the above-described Step A2, and thus the accuracy of measurement of the size of the package P deteriorates.

Example embodiments described below solve the above-described problem of the package measuring apparatus 90 according to the related art.

First Example Embodiment

Figure 7:
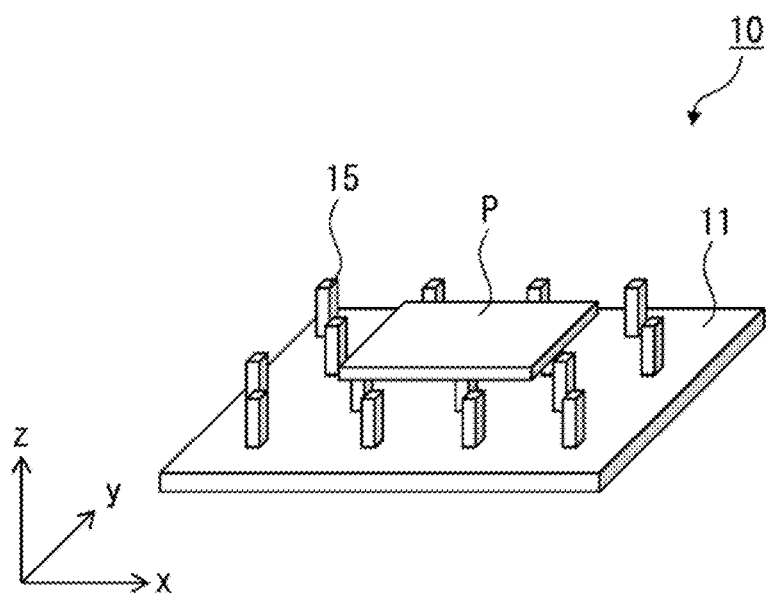
FIG. 7 is a perspective view showing an example of a configuration of a package measuring apparatus according to a first example embodiment.
Figure 8:
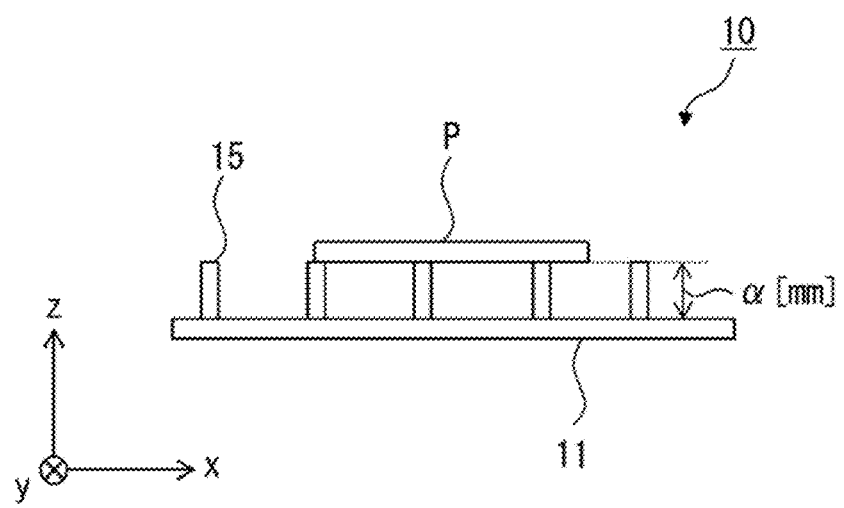
FIG. 8 is a front view showing an example of the configuration of the package measuring apparatus according to the first example embodiment.

Each of FIGS. 7 and 8 is a diagram showing an example of a configuration of a package measuring apparatus 10 according to a first example embodiment, FIG. 7 being a perspective view thereof, and FIG. 8 being a front view thereof. Note that each of FIGS. 7 and 8 shows only the configuration of the mounting table 11 and the surroundings thereof, and configurations other than this one are omitted since they are similar to those of the package measuring apparatus 90 according to the related art shown in FIG. 1. Specifically, in FIGS. 7 and 8, the depth sensor 12, the control unit 13, and the sensor attachment part 14 are omitted.

As shown in FIGS. 7 and 8, the package measuring apparatus 10 according to the first example embodiment differs from the package measuring apparatus 90 according to the related art shown in FIG. 1 in that a plurality of projections 15 are added as floatation members for floating the package P above the upper surface of the mounting table 11.

The plurality of projections 15 are members projecting from the upper surface of the mounting table 11.

The package P is placed on all or some of the plurality of projections 15. Thus, the package P is floating above the upper surface of the mounting table 11.

Further, the plurality of projections 15 have the same height ($\alpha$ [mm]) from the top surface of the mounting table 11. Thus, it is ensured that the package P is placed in a planar fashion while it is floating above the upper surface of the mounting table 11.

Note that, regarding the plurality of projections 15, the number of projections, the size of the projections in a plan view (the xy plane), the installation interval between the projections, and the like are not limited to particular ones. These may be appropriately determined in accordance with the size and the weight of the package P and the performances (e.g., the viewing angle, the number of sensor elements, and the positions of the sensor elements, which will be hereinafter the same) of the depth sensor 12. Further, in the examples shown in FIGS. 7 and 8, although the projection 15 has a quadrangular prism shape, the shape of the projection 15 is not limited to a particular shape. However, depending on the size of the package P, some projections 15 that are not covered by the package P are present as recognized by the depth sensor 12. When these projections 15 are recognized by the depth sensor 12, the control unit 13 may erroneously extract the contour of the package P. Therefore, it is preferable that the projections 15 not be recognized by the depth sensor 12. In order to achieve this, it is preferable that the size of the projection 15 in a plan view be sufficiently reduced. However, since the size of the projection 15 in a plan view which is not recognized by the depth sensor 12 varies according to the above-described performances of the depth sensor 12, the size of the projection 15 in a plan view may be appropriately determined according to the above-described performances of the depth sensor 12. Alternatively, the projection 15 may be made of glass, acrylic, or the like having a high transmittance so that it is not recognized by the depth sensor 12.

The above-described configuration of the package measuring apparatus 10 according to the first example embodiment provides an effect that the accuracy of measurement of the size of the package P can be improved even when the package P is a thin package. The reason why the above effect is obtained will be described below with reference to FIG. 9. Note that, in the example shown in FIG. 9, like in the example shown in FIG. 6, it is assumed that the height of the package P is $\Delta\alpha$ [mm] and the distance from the depth sensor 12 to the upper surface of the mounting table 11 is X [mm].

Figure 9:
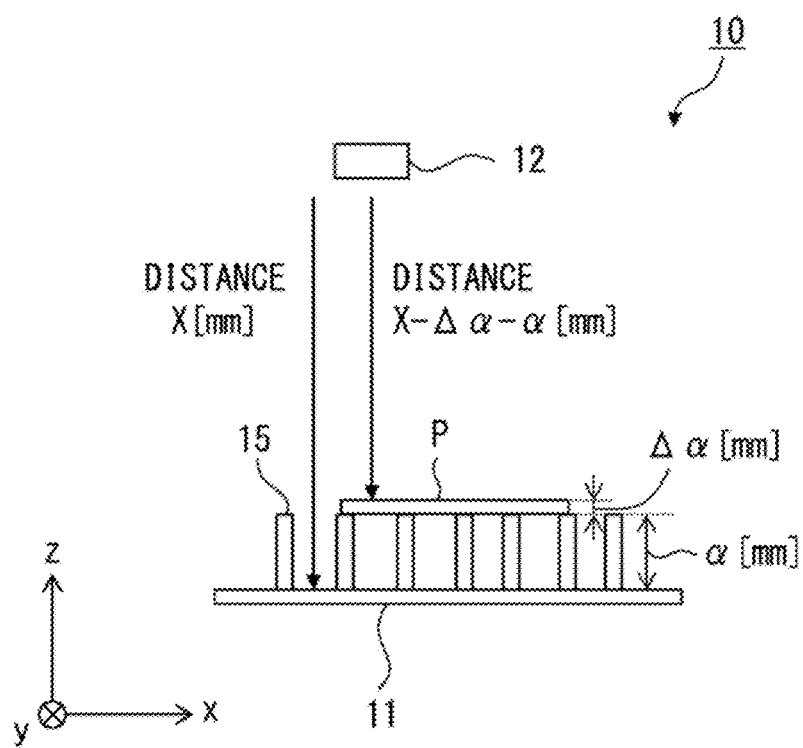
FIG. 9 is a diagram for explaining an effect of the package measuring apparatus according to the first example embodiment.

As shown in FIG. 9, the package measuring apparatus 10 according to the first example embodiment includes the plurality of projections 15 projecting from the upper surface of the mounting table 11 which enable the package P to float above the upper surface of the mounting table 11.

Therefore, a space corresponding to the height a [mm] of the projection 15 is formed between the mounting table 11 and the package P. As a result, the distance from the depth sensor 12 to the upper surface of the package P becomes X-$\Delta\alpha$-$\alpha$ [mm], and a difference is generated between this distance and the distance X [mm] from the depth sensor 12 to the upper surface of the mounting table 11. Thus, since the control unit 13 can identify the package P even when the package P is a thin package, the contour of the package P in a plan view can be accurately extracted in the above-described Step A2, and as a result, the accuracy of measurement of the size of the package P can be improved.

However, it is preferable that the height a [mm] of the projection 15 be a sufficient height so as to distinguish that the above-described X-$\Delta\alpha$-$\alpha$ is not the value (X$\pm\beta$) varied by the variation $\beta$ [mm] of the depth sensor 12. Therefore, the height a of the projection 15 and the variation $\beta$ of the depth sensor 12 preferably have a relationship of $\alpha>2\times\beta$.

Next, a schematic flow of operations performed when the package measuring apparatus 10 according to the first example embodiment measures a size of the package P will be described with reference to FIG. 10.

Figure 10:
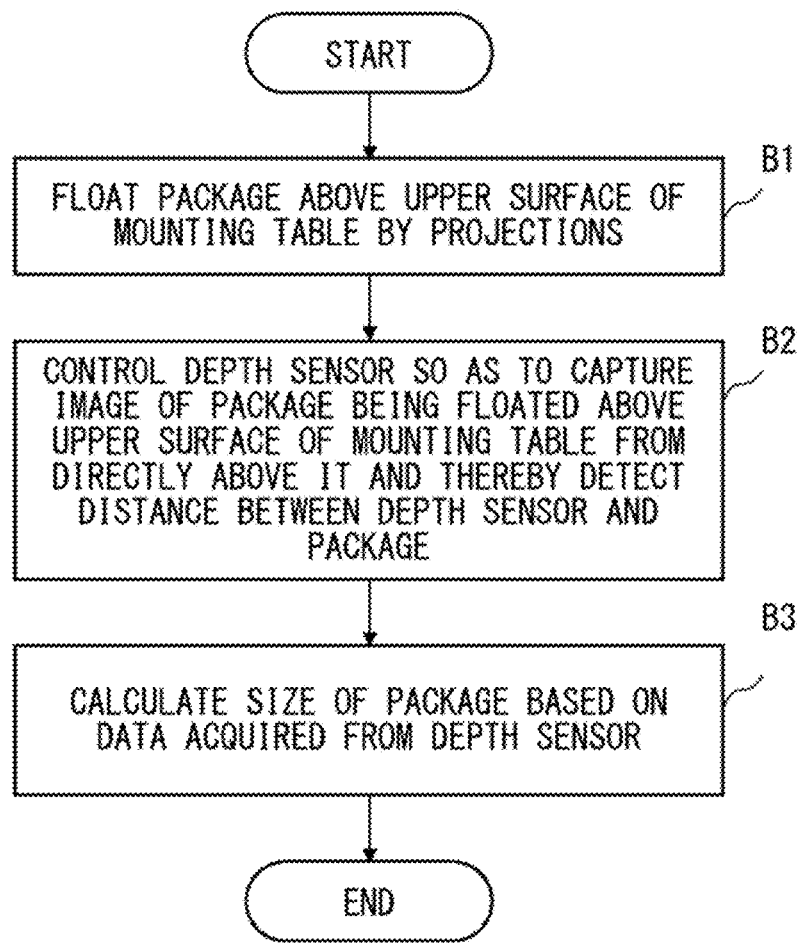
FIG. 10 is a flow diagram for explaining an example of a schematic flow of operations performed when the package measuring apparatus according to the first example embodiment measures a size of a package.

As shown in FIG. 10, first, the plurality of projections 15 float the package P above the upper surface of the mounting table 11 (Step B1).

Next, the control unit 13 controls the depth sensor 12 so as to capture an image of the package P being floated by the plurality of projections 15 above the upper surface of the mounting table 11 from directly above it and thereby detects a distance between the depth sensor 12 and the package P (Step B2). Step B2 corresponds to Step A1 described above.

After that, the control unit 13 calculates the size of the package P based on data acquired from the depth sensor 12 (Step B3). Step B3 corresponds to Steps A2 to A4 described above. Therefore, Step B3 may be executed by procedures substantially similar to those of Steps A2 to A4 described above.

As described above, according to the first example embodiment, the plurality of projections 15 projecting from the upper surface of the mounting table 11 which enable the package P to float above the upper surface of the mounting table 11 are provided.

By this structure, a difference corresponding to the height of the projection 15 is generated between the distance from the depth sensor 12 to the upper surface of the package P and the distance X [mm] from the depth sensor 12 to the upper surface of the mounting table 11. Thus, the control unit 13 can identify the package P and accurately extract the contour of the package P in a plan view, and as a result, the accuracy of measurement of the size of the package P can be improved.

Other Example Embodiments

[a]

In the above-described first example embodiment, although the plurality of projections 15 are provided as floatation members for floating the package P above the upper surface of the mounting table 11, the floatation member is not limited thereto.

Figure 11:
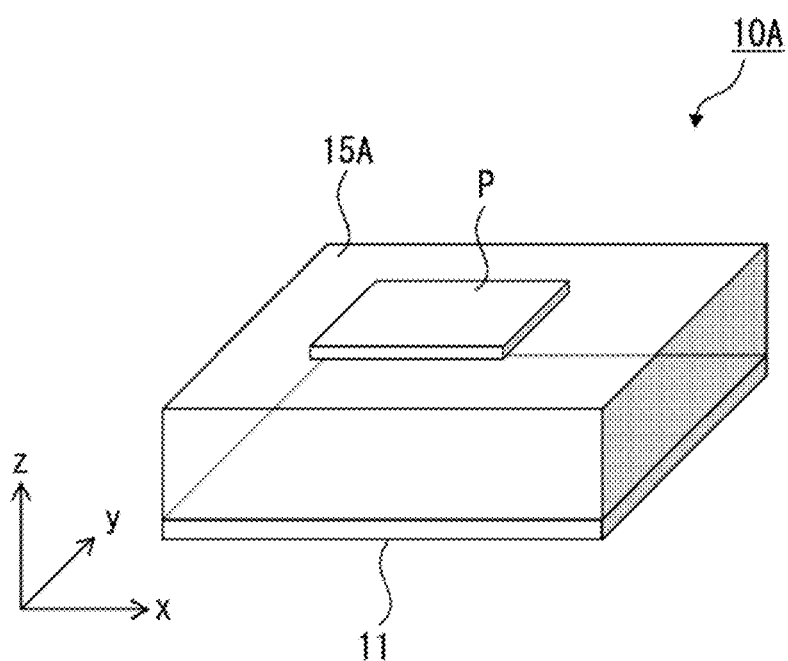
FIG. 11 is a perspective view showing an example of a configuration of a package measuring apparatus according to another example embodiment.
Figure 12:
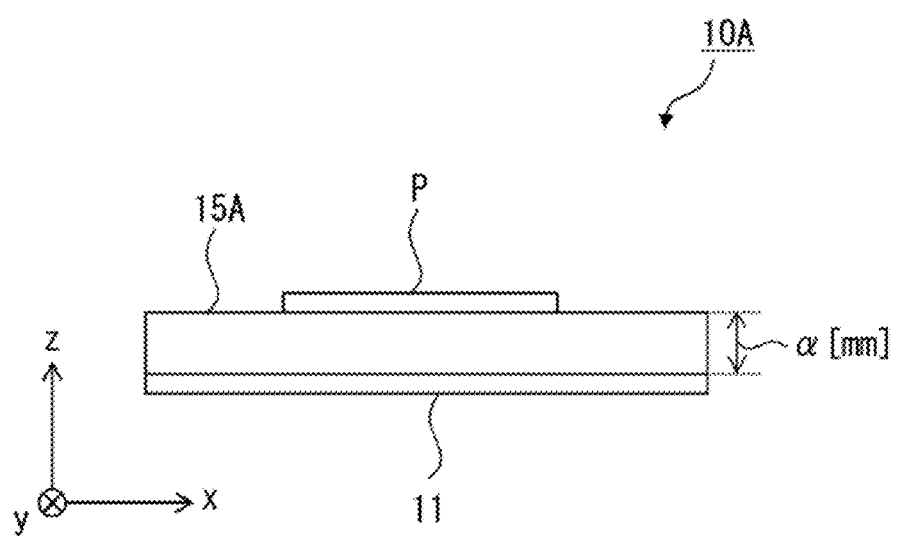
FIG. 12 is a front view showing an example of the configuration of the package measuring apparatus according to another example embodiment.

For example, in a package measuring apparatus 10A shown in FIGS. 11 and 12, the floatation member is a rectangular parallelepiped transmissive member 15A which is installed on the upper surface of the mounting table 11 and which is made of a transmissive material having a high transmittance such as glass, acrylic, and polycarbonate. Since the transmissive member 15A is made of a transmissive material, it is not recognized by the depth sensor 12.

The package P is placed on the upper surface of the transmissive member 15A.

By the above, like in the above-described first example embodiment, since a difference is generated between the distance from the depth sensor 12 to the upper surface of the package P and the distance from the depth sensor 12 to the upper surface of the mounting table 11, the control unit 13 can identify the package P.

Note that, like in the above-described first example embodiment, the height a of the transmissive member 15A from the upper surface of the mounting table 11 and the variation $\beta$ in the value of the distance detected by the depth sensor 12 preferably have a relationship of $\alpha>2\times\beta$.

Further, the shape of the transmissive member 15A is not limited to a rectangular parallelepiped shape. The transmissive member 15A may be a columnar body (e.g., a cylindrical body and a polygonal columnar body) having a flat upper base surface.

[b]

Figure 13:
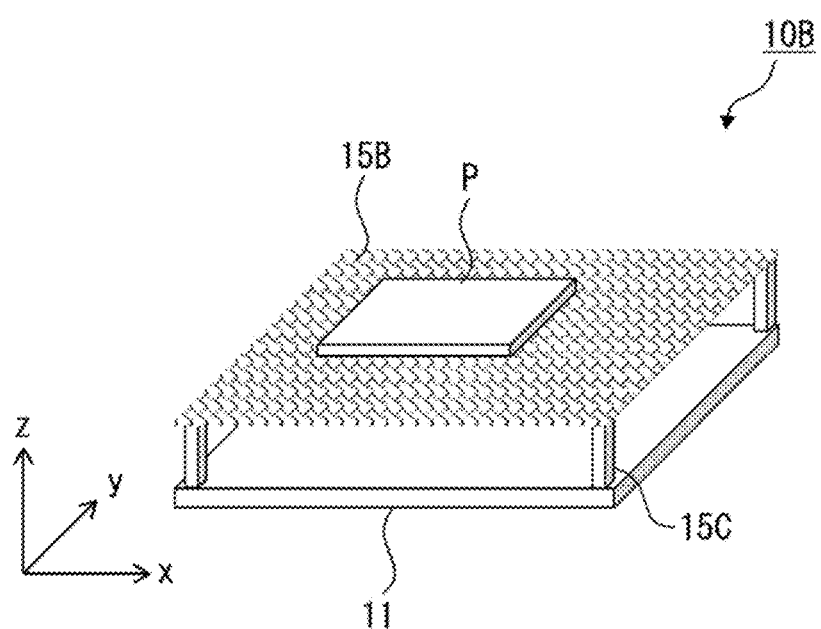
FIG. 13 is a perspective view showing an example of a configuration of a package measuring apparatus according to still another example embodiment.
Figure 14:
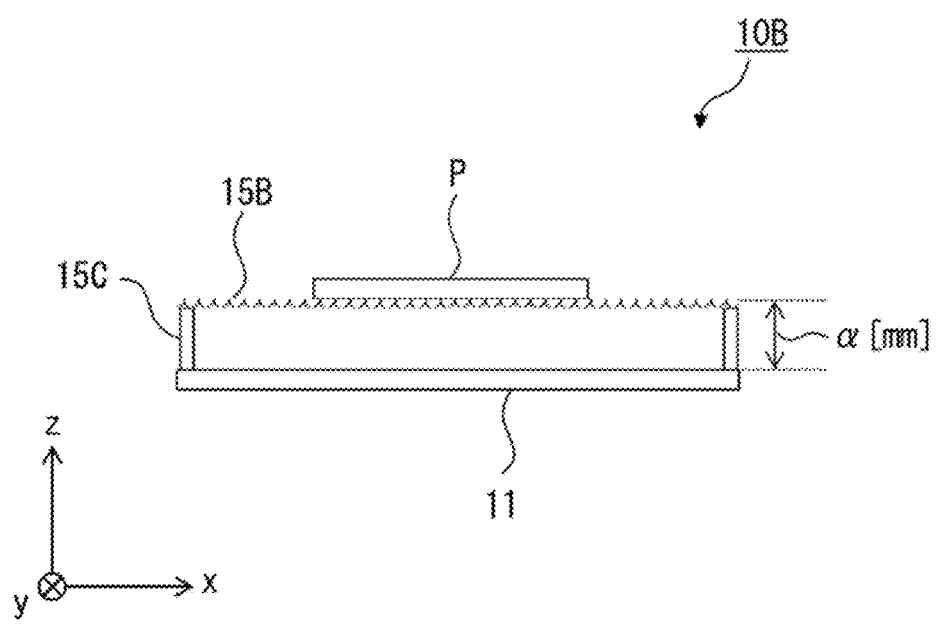
FIG. 14 is a front view showing an example of the configuration of the package measuring apparatus according to still another example embodiment.

Further, in a package measuring apparatus 10B shown in FIGS. 13 and 14, the floatation member includes a planar net-like member 15B and a support member 15C that supports the net-like member 15B so that the net-like member 15B is floating above the upper surface of the mounting table 11. The net part of the net-like member 15B is preferably granular so that it is not recognized by the depth sensor 12. However, since the grain size of the net part of the net-like member 15B which is not recognized by the depth sensor 12 varies according to the above-described performances of the depth sensor 12, it may be appropriately determined according to the above-described performances of the depth sensor 12. Further, the number of support members 15C to be installed is set to four, and they are installed at the respective four corners of the upper surface of the mounting table 11. However, the number of support members to be installed and a method for installing them are not limited to a particular number and method. Further, although the shape of the support member 15C is a quadrangular prism shape, the shape thereof is not limited to a particular shape.

The package P is placed on the upper surface of the net-like member 15B.

By the above, like in the above-described first example embodiment, since a difference is generated between the distance from the depth sensor 12 to the upper surface of the package P and the distance from the depth sensor 12 to the upper surface of the mounting table 11, the control unit 13 can identify the package P.

Note that, like in the above-described first example embodiment, the height a of the net-like member 15B from the upper surface of the mounting table 11 and the variation Pin the value of the distance detected by the depth sensor 12 preferably have a relationship of $\alpha > 2 \times \beta$.

[c]

Figure 15:
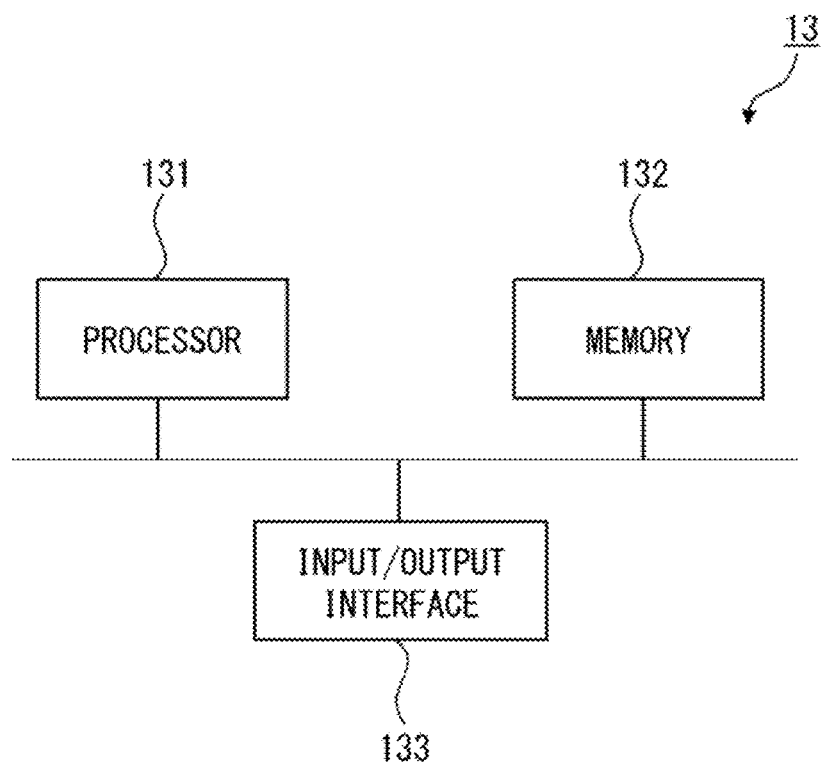
FIG. 15 is a diagram showing an example of a hardware configuration of a control unit according to the first example embodiment.

The control unit 13 according to the above-described first example embodiment may include the following hardware configuration. FIG. 15 is a diagram showing an example of the hardware configuration of the control unit 13 according to the above-described first example embodiment.

The control unit 13 shown in FIG. 15 includes a processor 131, a memory 132, and an input/output interface 133 for establishing connections to the depth sensor 12 and the like. The processor 131 is, for example, an arithmetic processing unit such as a Central Processing Unit (CPU) or a Graphics Processing Unit (GPU). The memory 132 is, for example, a memory such as a Random Access Memory (RAM) or a Read Only Memory (ROM). The memory 132 stores a program for implementing all or some of the functions of the control unit 13 described in the above first example embodiment. The processor 131 reads and executes this program, thereby implementing all or some of the functions of the control unit 13. Further, the memory 132 also have a function of storing information and data held by the control unit 13.

Further, the above-described program may be stored in a non-transitory computer readable medium or a tangible storage medium. By way of example, and not a limitation, non-transitory computer readable media or tangible storage media can include a RAM, a ROM, a flash memory, a Solid State Drive (SSD) or other types of memory technologies, a Compact Disc-ROM (CD-ROM), a Digital Versatile Disc (DVD), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The above example embodiments can be combined as desirable by one of ordinary skill in the art.

Although the present disclosure has been described with reference to the example embodiments, the present disclosure is not limited to the above-described example embodiments. Various changes that may be understood by those skilled in the art may be made to the configurations and details of the present disclosure within the scope of the disclosure.

What is claimed is:

1. A package measuring apparatus comprising:
    a mounting table;
    a floatation member having a physical structure adapted to float a package above an upper surface of the mounting table;
    a depth sensor configured to capture an image of the package being floated by the floatation member above the upper surface of the mounting table and thereby detect a distance between the depth sensor and the package, the depth sensor being disposed at a position where the depth sensor is able to capture the image of the package from substantially directly above the package; and
    a memory storing instructions and a processor configured to execute the instructions to calculate a size of the package based on data acquired from the depth sensor,
    wherein in a case in which a is a height of the floatation member from the upper surface of the mounting table and β is a variation in a value of a distance detected by the depth sensor, α and β have a relationship of $\alpha > 2 \times \beta$.

2. The package measuring apparatus according to claim 1, wherein the floatation member comprises a plurality of projections projecting from the upper surface of the mounting table.

3. The package measuring apparatus according to claim 1, wherein the floatation member is a columnar body having a flat upper base surface, the floatation member being installed on the upper surface of the mounting table and being made of a transmissive material.

4. The package measuring apparatus according to claim 1, wherein
    the floatation member comprises:
    a planar net-like member; and
    a support member having a physical structure adapted to support the net-like member so that the net-like member is floating above the upper surface of the mounting table.

5. A package measuring method comprising:
    floating a package above an upper surface of a mounting table by a floatation member;
    capturing an image of the package being floated by the floatation member above the upper surface of the mounting table and thereby detecting a distance between a depth sensor and the package by the depth sensor disposed at a position where the depth sensor is able to capture the image of the package from substantially directly above the package; and
    calculating a size of the package based on data acquired from the depth sensor,
    wherein in a case in which α is a height of the floatation member from the upper surface of the mounting table and β is a variation in a value of a distance detected by the depth sensor, α and β have a relationship of $\alpha > 2 \times \beta$.

* * * * *